United States Patent [19]

Fennell

[11] Patent Number: 4,685,246
[45] Date of Patent: Aug. 11, 1987

[54] COMPARTMENTALIZED PORTABLE GARDEN WITH RAISED CENTER

[76] Inventor: Lillie Fennell, 3751 S. Sutro Ave., Los Angeles, Calif. 90018

[21] Appl. No.: 794,656

[22] Filed: Dec. 20, 1985

[51] Int. Cl.⁴ ............................................. A01G 9/02
[52] U.S. Cl. ..................................... 47/66; 47/83
[58] Field of Search .............. 47/66, 83, 82; D11/155; D6/403, 405; 188/69; 220/22, 23.86; 217/18, 22

[56] References Cited

U.S. PATENT DOCUMENTS

| | | | |
|---|---|---|---|
| 140,082 | 1/1945 | Hathaway | 47/83 |
| 2,651,143 | 9/1953 | Esmay et al. | 47/82 |
| 3,041,782 | 7/1962 | Bachman | 47/39 |
| 3,310,910 | 3/1967 | Titus | D11/155 |
| 4,250,666 | 2/1981 | Rakestraw | 47/39 |

FOREIGN PATENT DOCUMENTS 210800 8/1940 Switzerland ............................ 47/83

Primary Examiner—Robert E. Bagwill
Assistant Examiner—Bradley M. Lewis
Attorney, Agent, or Firm—Poms, Smith, Lande & Rose

[57] ABSTRACT

A portable box garden assembly having a main elongated compartmentalized rectangular box and a raised center section.

10 Claims, 8 Drawing Figures

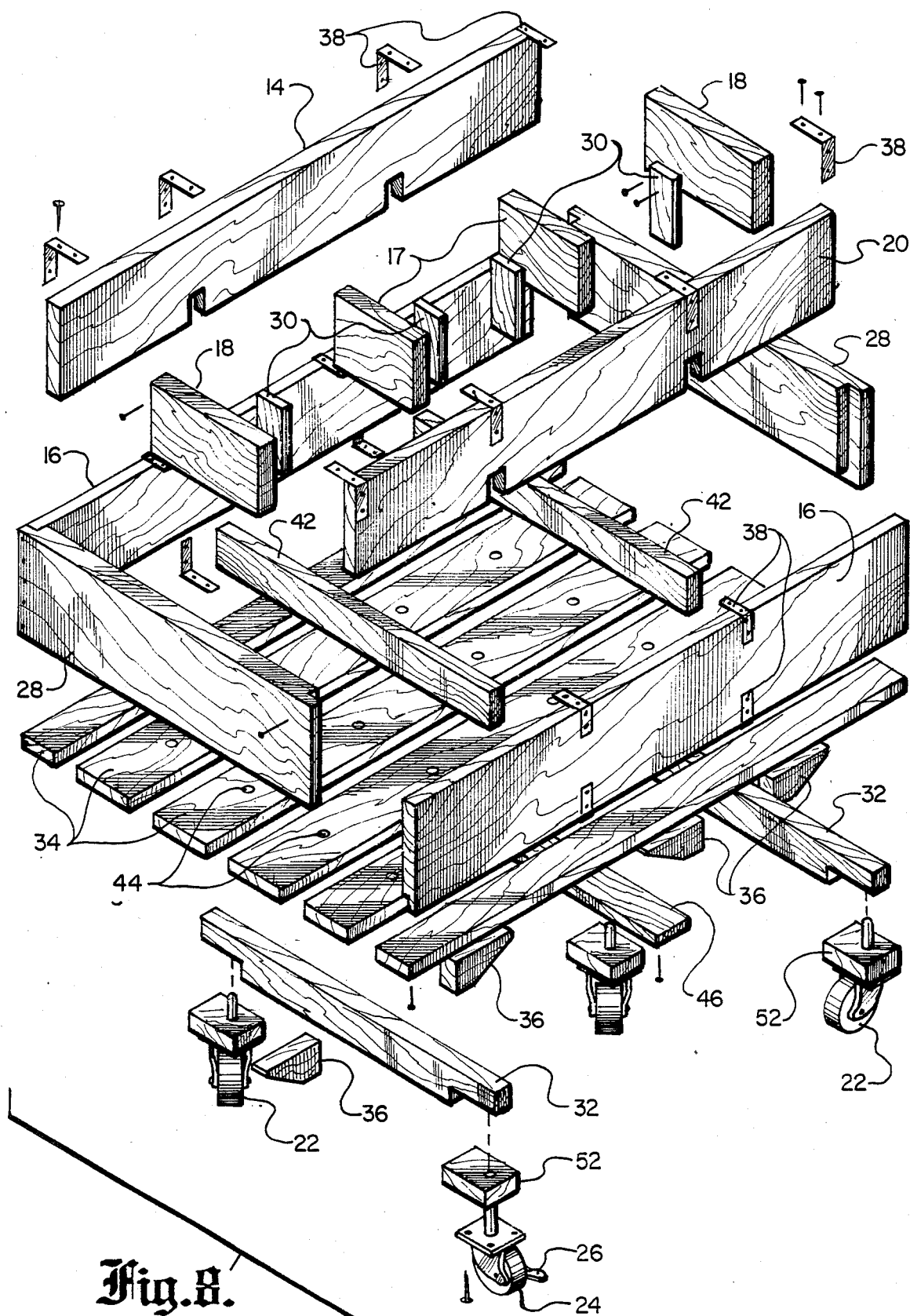

COMPARTMENTALIZED PORTABLE GARDEN WITH RAISED CENTER

The Compartmentalized Portable Garden With Raised Center is designed to grow anything from artichokes to thyme year round. In this age of shrinking land space and compartmentalized apartment type living gardening can still be a reality.

The Compartmentalized Portable Garden With Raised Center is 3 feet by 6 feet. It contains nine compartments, six for low growing plants and three for taller plants. Four wheels at each corner aid in mobility with two locking wheels to ensure stability and prevent movement. Roll it indoors or outdoors, turn it to catch the sun.

The Compartmentalized Portable Garden With Raised Center is easy to care for because it can be moved, it is easily accessable because it's above ground level and it is small enough to house on a patio.

DESCRIPTION

Figure 1:
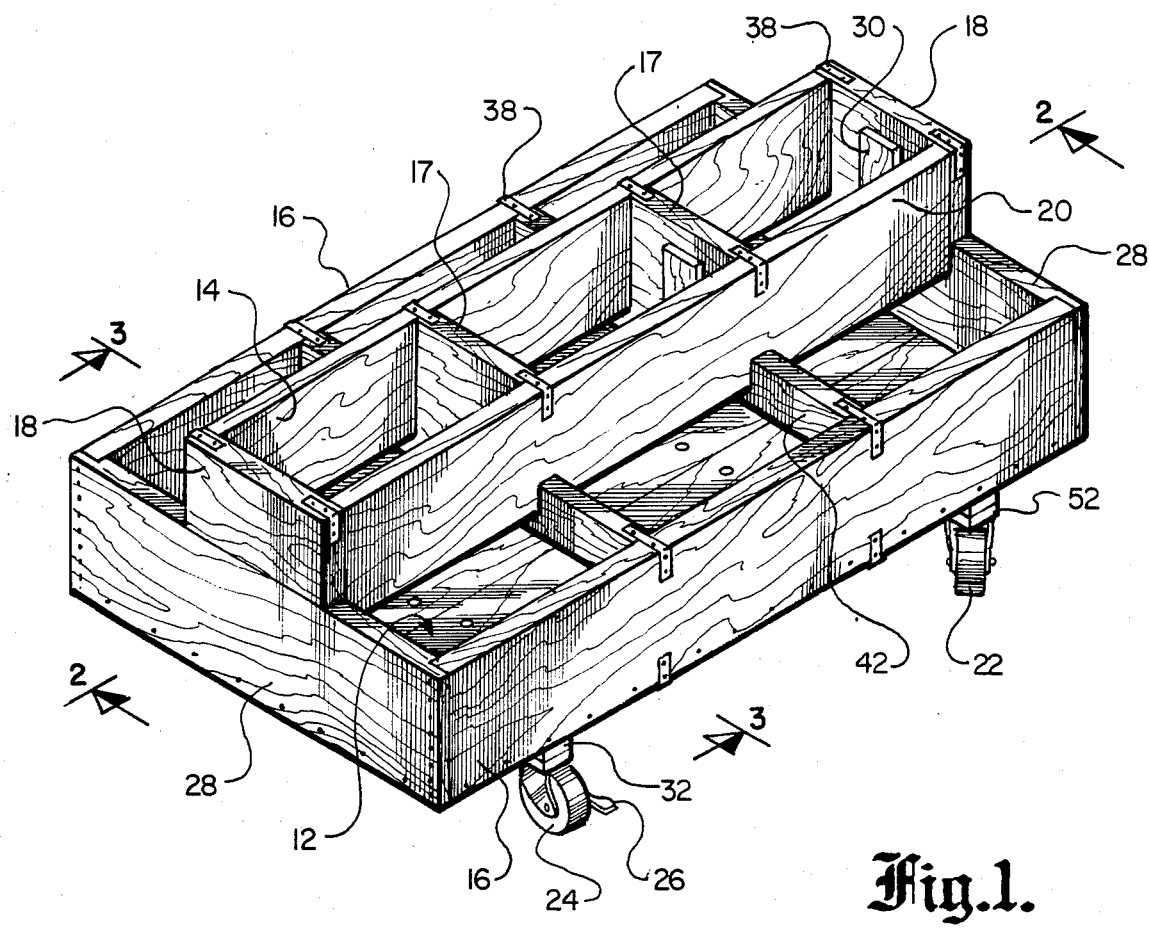
Figure 2:
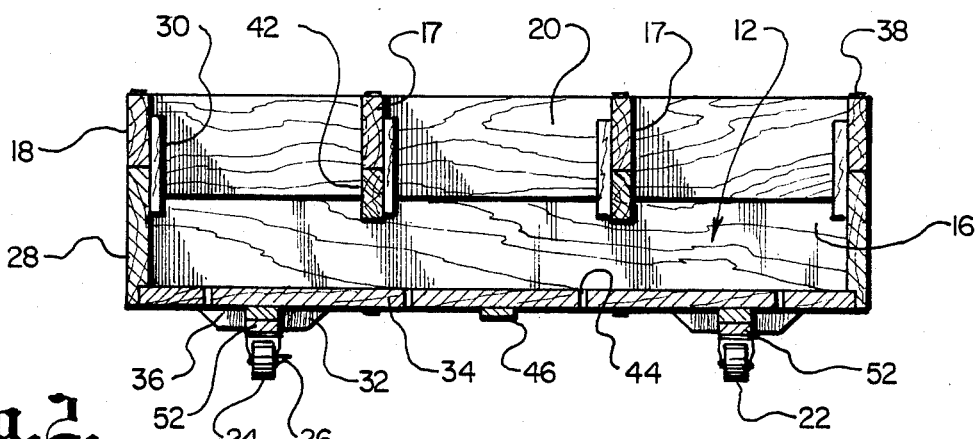
Figure 3:
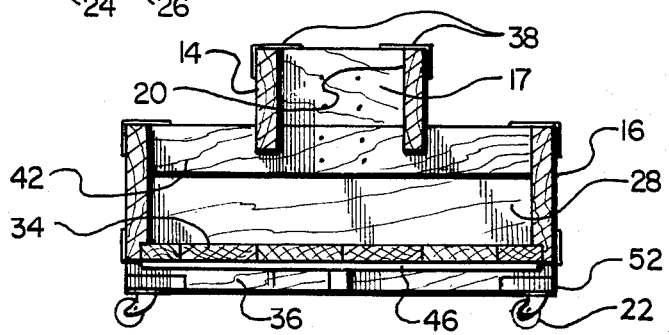
Figure 4:
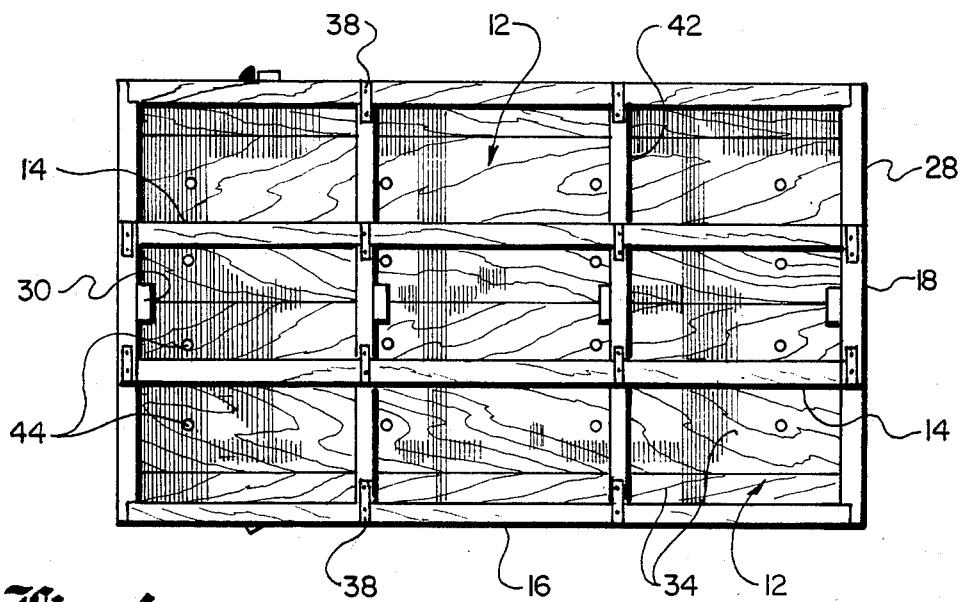
Figure 5:
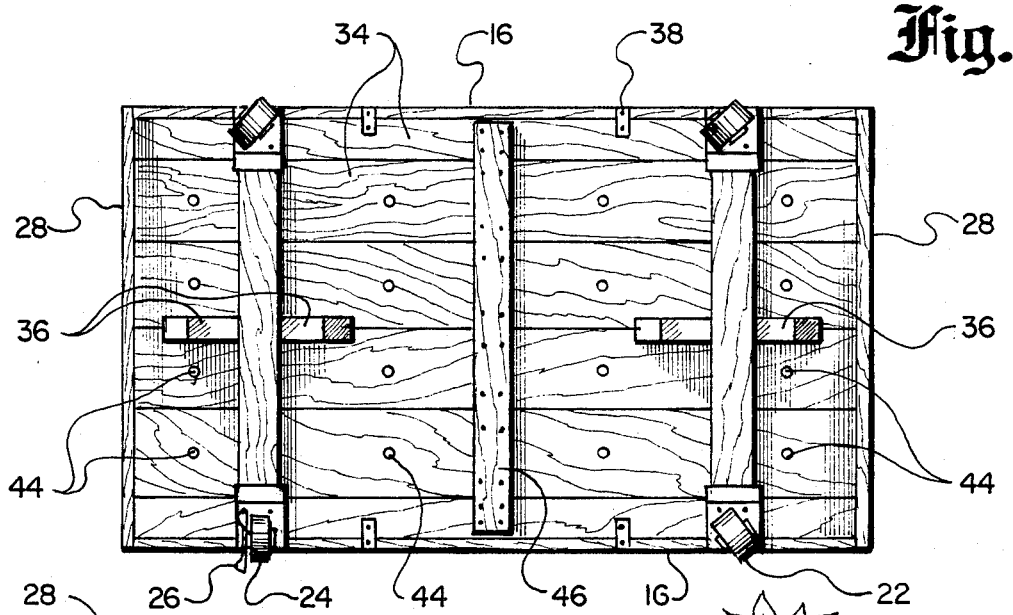
Figure 6:
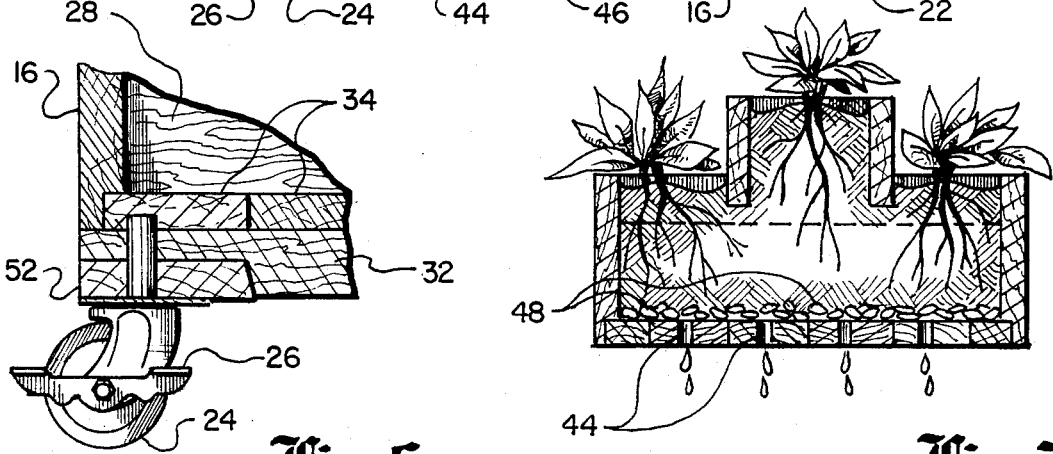
Figure 7:
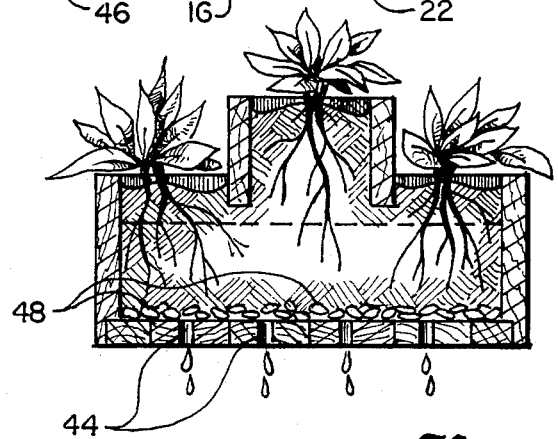

FIG. 1 is a full view of the unit.
FIG. 2 is a longitudinal cross section of the unit.
FIG. 3 is a side view of a cross section.
FIG. 4 is a top view of the unit and
FIG. 5 is a bottom view.
FIG. 6 shows the mobility structure.
FIG. 7 shows the utility of the unit.
FIG. 8 shows a perspective view of the unit.

Referring now to the drawings in detail, it will be seen that the embodiment of the invention is comprised of Redwood, metal braces, nails to hold it together and wheels to enable mobility.

Beginning at the bottom the entire unit rest on wheels 22 to enable the unit to move when necessary. 24 Two locking wheels placed at opposing ends ensure stability when lock 26 is used. 52 The footing joist plate provides the support base for the wheels. Two distal footing joists 32 provide foundation and support at both ends of the unit for the floor of the unit. 36 Supports the distal footing joist as does 46 provide support to the middle of the unit's floor. 34 Redwood planks together comprise 12 the floor of the unit to hold the contents in place. 44 Drainage holes in the floor of the unit provide run-off for excess water. The walls of the lower gardening level are made up of 16 and 28. 42 Divides the lower gardening level into six sections and supports the superior gardening level. Metal braces 38 are used to hold the unit together on the superior level and as decoration. 18, 20 and 14 make up the walls of the superior garden. Used to separate the superior gardening level into compartments is 17 compartment dividers and wood braces reinforce the compartment walls and link the superior level gardening compartment dividers to the lower level gardening comparment dividers for stability.

I claim:

1. A portable box garden assembly for simultaneously growing a plurality of different types of plants comprising:
   a main elongated substantially rectangular box having two sides, two ends, and a bottom, for containing earth;
   means for providing an upper gardening level comprising an elongated rectangular frame, open at the bottom, and supported centrally from said main elongated box, said means including two upper end members vertically aligned with the ends of said main box, but each having a length which is shorter than the ends of said main box, and said means for providing an upper gardening level also including two longitudinally extending sides secured to said upper end members to form said frame which provides an upper gardening level within its confines and residual lower gardening levels on either side thereof;
   lower partition means mounted substantially flush with the upper edges of said main box for subdividing the lower gardening levels on both sides of said upper gardening frame;
   upper partition means mounted flush with said frame for subdividing said upper gardening level; and
   all of said gardening areas opening into a main lower space within said main box for containing earth;
   whereby different groups of plants may be planted and segregated in each of the upper and lower gardening areas, but may be watered and drained as a single garden unit.

2. A portable box garden assembly as defined in claim 1 wherein said assembly is formed of redwood boards.

3. A portable box garden assembly as defined in claim 1 further including roller means for supporting said assembly.

4. A portable box garden assembly as defined in claim 1 wherein said assembly includes at least nine separate gardening areas, at least three on the upper level and at least three on the lower level on either side of the upper gardening level.

5. A portable box garden assembly as defined in claim 2 further comprising roller means secured to the bottom of said main box.

6. A portable box garden assembly as defined in claim 1 wherein the bottom of said main box is provided with a plurality of drainage holes.

7. A portable box garden assembly as defined in claim 1 further comprising roller means secured to said main box, and means for locking at least two of said roller means against rotation.

8. A portable box garden assembly for simultaneously growing a plurality of different types of plants comprising:
   a main elongated substantially rectangular box having two sides, two ends and a bottom, for containing earth;
   means for providing an upper gardening level comprising an elongated rectangular frame, open at the bottom, and supported centrally from said main elongated box, said means including two upper end members vertically aligned with the ends of said main box, but each having a length which is shorter than the ends of said main box, and said means for providing an upper gardening level also including two longitudinally extending sides secured to said upper end members to form said frame providing an upper gardening level within its confines, said longitudinally extending side members being spaced back from sides of main box to provide residual lower gardening levels on either side thereof;
   lower partition means mounted substantially flush with the upper edges of said main box for subdividing the lower gardening levels on both sides of said upper gardening frame;
   upper partition means mounted flush with said frame for subdividing said upper gardening level;

all of said gardening areas opening into a main lower space within said main box for containing earth;

said box garden assembly being principally formed of wooden boards;

drainage holes through the bottom of said main box; and roller means for movably supporting the box garden assembly;

whereby different groups of plants may be planted and segregated in each of the upper and lower gardening areas, but may be watered and drained as a single garden unit.

9. A portable box garden assembly as defined in claim 8 wherein said assembly is formed of redwood boards.

10. A portable box garden assembly as defined in claim 8 wherein said assembly includes at least nine separate gardening areas, at least three on the upper level and at least three on the lower level on either side of the upper gardening level.

* * * * *